(12) United States Patent
Chomik

(10) Patent No.: US 7,594,376 B2
(45) Date of Patent: Sep. 29, 2009

(54) AUTOMATED TWIST DIAPER DISPOSAL APPARATUS

(75) Inventor: Richard S. Chomik, Orlando, FL (US)

(73) Assignee: Playtex Products, Inc., Westport, CT (US)

( * ) Notice: Subject to any disclaimer, the term of this patent is extended or adjusted under 35 U.S.C. 154(b) by 174 days.

(21) Appl. No.: 10/931,337

(22) Filed: Sep. 1, 2004

(65) Prior Publication Data

US 2005/0115207 A1   Jun. 2, 2005

Related U.S. Application Data

(60) Provisional application No. 60/499,443, filed on Sep. 2, 2003.

(51) Int. Cl.
*B65B 9/10* (2006.01)

(52) U.S. Cl. .............................. 53/567; 53/370; 53/526

(58) Field of Classification Search ............... 53/390, 53/567, 577, 526, 527, 576, 370; 220/495.06, 220/264, 263, 908.1, 908
See application file for complete search history.

(56) References Cited

U.S. PATENT DOCUMENTS

| | | | |
|---|---|---|---|
| 1,226,634 A | 5/1917 | Briese | |
| 1,239,427 A | 9/1917 | Bunnell et al. | |
| 1,265,148 A | 5/1918 | Warren | |
| 2,411,430 A | 11/1946 | Hodson | |
| 3,077,457 A | 2/1963 | Kulka | |
| 3,321,103 A | 5/1967 | Phillips | |
| 3,452,368 A * | 7/1969 | Couper | ........................... 4/484 |
| 3,516,846 A | 6/1970 | Matson | |
| 3,516,941 A | 6/1970 | Matson | |
| 3,536,192 A | 10/1970 | Couper | |
| 3,579,416 A | 5/1971 | Schrenk | |
| 3,602,924 A | 9/1971 | Kneisley | |
| 3,619,822 A | 11/1971 | Carmichel | |
| 3,655,129 A | 4/1972 | Seiner | |
| 3,741,253 A | 6/1973 | Brax et al. | |
| 3,762,454 A | 10/1973 | Wilkins, Jr. | |
| 3,778,383 A | 12/1973 | Chibler et al. | |
| 3,835,692 A * | 9/1974 | Hoffman | ..................... 72/442 |
| 3,923,005 A | 12/1975 | Fry et al. | |

(Continued)

FOREIGN PATENT DOCUMENTS

CA      2019173      12/1990

(Continued)

OTHER PUBLICATIONS

Office Action from U.S. Appl. No. 11/390,941 dated Dec. 19, 2008.

(Continued)

*Primary Examiner*—Louis K Huynh
(74) *Attorney, Agent, or Firm*—Ohlandt, Greeley, Ruggiero & Perle, L.L.P.

(57) ABSTRACT

A waste disposal receptacle is provided with an apparatus for sanitarily disposing of solid waste material such as diapers, hospital and nursing home waste products, and biologically hazardous wastes. The receptacle houses an automated mechanism for sealing and packaging the waste material and includes a container, a motorized turning device and a cassette containing a storage of flexible tubing for packaging the waste material.

15 Claims, 6 Drawing Sheets

U.S. PATENT DOCUMENTS

| | | | |
|---|---|---|---|
| 3,935,692 A | 2/1976 | Miller | |
| 4,009,253 A | 2/1977 | Schleppnik | |
| 4,025,969 A | 5/1977 | Dahlen | |
| 4,087,376 A | 5/1978 | Foris et al. | |
| 4,089,802 A | 5/1978 | Foris et al. | |
| 4,100,103 A | 7/1978 | Foris et al. | |
| 4,101,711 A | 7/1978 | Stillman | |
| 4,187,251 A | 2/1980 | Schleppnik | |
| 4,251,386 A | 2/1981 | Saeki et al. | |
| 4,254,169 A | 3/1981 | Schroeder | |
| 4,254,179 A | 3/1981 | Carson, III et al. | |
| 4,275,651 A | 6/1981 | Groth et al. | |
| 4,284,444 A | 8/1981 | Bernstein et al. | |
| 4,310,512 A | 1/1982 | Schleppnik | |
| 4,351,876 A | 9/1982 | Doi et al. | |
| 4,427,110 A | 1/1984 | Shaw, Jr. | |
| 4,519,104 A | 5/1985 | Nilsson | |
| 4,612,221 A | 9/1986 | Biel et al. | |
| 4,622,221 A | 11/1986 | Schleppnik | |
| 4,660,758 A | 4/1987 | Tavel et al. | |
| 4,705,707 A | 11/1987 | Winter | |
| 4,716,061 A | 12/1987 | Winter | |
| 4,865,371 A | 9/1989 | Egberg | |
| 4,869,049 A | 9/1989 | Richards et al. | |
| 4,893,722 A | 1/1990 | Jones | |
| 4,898,633 A | 2/1990 | Doree et al. | |
| 4,909,986 A | 3/1990 | Kobayashi et al. | |
| 4,934,529 A | 6/1990 | Richards et al. | |
| 4,959,207 A | 9/1990 | Ueda et al. | |
| 4,974,746 A | 12/1990 | Dickinson | |
| 5,022,553 A | 6/1991 | Pontius | |
| 5,025,719 A | 6/1991 | Thomas | |
| 5,027,578 A * | 7/1991 | Natterer et al. | 53/86 |
| 5,031,793 A | 7/1991 | Chen et al. | |
| 5,039,243 A | 8/1991 | O'Brien | |
| 5,056,293 A | 10/1991 | Richards et al. | |
| 5,125,526 A | 6/1992 | Sumanis | |
| 5,129,735 A | 7/1992 | Neal et al. | |
| 5,147,055 A | 9/1992 | Samson et al. | |
| 5,158,199 A | 10/1992 | Pontius | |
| 5,174,462 A | 12/1992 | Hames | |
| 5,238,301 A | 8/1993 | Brady | |
| 5,294,017 A | 3/1994 | Li | |
| 5,295,607 A | 3/1994 | Chang | |
| 5,303,841 A | 4/1994 | Mezey | |
| 5,337,581 A | 8/1994 | Lott | |
| 5,385,259 A | 1/1995 | Bernstein et al. | |
| 5,520,303 A | 5/1996 | Bernstein et al. | |
| 5,534,105 A | 7/1996 | Boyd | |
| 5,534,165 A | 7/1996 | Pilosof et al. | |
| 5,535,913 A | 7/1996 | Asbach et al. | |
| 5,590,512 A | 1/1997 | Richards et al. | |
| 5,640,931 A | 6/1997 | Markham | |
| 5,655,680 A | 8/1997 | Asbach et al. | |
| 5,659,933 A | 8/1997 | McWilliams | |
| 5,718,887 A | 2/1998 | Wolf et al. | |
| 5,799,909 A | 9/1998 | Ziegler | |
| 5,813,200 A | 9/1998 | Jacoby et al. | |
| 5,860,959 A | 1/1999 | Gent | |
| 5,938,305 A | 8/1999 | Rubsam-Tomlinson | |
| 6,047,843 A | 4/2000 | Mecke | |
| 6,065,272 A | 5/2000 | Lecomte | |
| 6,128,890 A | 10/2000 | Firth | |
| 6,129,715 A | 10/2000 | Cunningham | |
| 6,129,716 A | 10/2000 | Steer | |
| 6,141,945 A | 11/2000 | Becher | |
| 6,150,004 A | 11/2000 | Oikawa et al. | |
| 6,170,240 B1 | 1/2001 | Jacoby et al. | |
| 6,202,877 B1 | 3/2001 | La Torre et al. | |
| 6,258,423 B1 | 7/2001 | Giori | |
| 6,370,847 B1 | 4/2002 | Jensen et al. | |
| 6,516,588 B2 | 2/2003 | Jensen et al. | |
| 6,612,099 B2 * | 9/2003 | Stravitz | 53/567 |
| 6,719,194 B2 * | 4/2004 | Richards | 232/43.1 |
| 6,804,930 B2 * | 10/2004 | Stravitz | 53/567 |
| 6,851,251 B2 * | 2/2005 | Stravitz | 53/567 |
| 6,925,781 B1 | 8/2005 | Knuth et al. | |
| 2002/0162304 A1 * | 11/2002 | Stravitz | 53/567 |
| 2003/0208995 A1 * | 11/2003 | Stravitz | 53/567 |
| 2004/0020175 A1 * | 2/2004 | Stravitz | 53/567 |
| 2005/0016890 A1 | 1/2005 | Tannock | |

FOREIGN PATENT DOCUMENTS

| | | |
|---|---|---|
| CA | 1298191 | 3/1992 |
| CA | 1318234 | 5/1993 |
| CA | 2486136 | 5/2005 |
| EP | 0281355 | 9/1988 |
| EP | 0404470 | 12/1990 |
| FR | 0005660 | 11/1979 |
| GB | 1156725 | 7/1969 |
| GB | 2041319 | 9/1980 |
| GB | 2048206 | 12/1980 |
| JP | 592039015 | 9/2000 |
| WO | WO 02/051788 | 7/2002 |
| WO | WO 02/083525 | 10/2002 |

OTHER PUBLICATIONS

Office Action from U.S. Appl. No. 11/707,714 dated Dec. 31, 2008.
Office Action from U.S. Appl. No. 11/707,714 dated Nov. 29, 2007.

* cited by examiner

AUTOMATED TWIST DIAPER DISPOSAL APPARATUS

CROSS-REFERENCE TO RELATED APPLICATIONS

This application claims benefit under 35 U.S.C. § 119(e) of U.S. provisional application Ser. No. 60/499,443, filed on Sep. 2, 2003.

BACKGROUND OF THE INVENTION

1. Field of the Invention

The present invention relates generally to a waste disposal apparatus and, more particularly, to an automated apparatus particularly suited for the sanitary and odorless disposal of waste such as soiled diapers.

2. Description of the Related Art

There are a number of systems for disposing of waste materials such as soiled diapers. The systems are often touted as a convenient way to dispose of such waste materials and reduce or eliminate any odor that may emanate from the materials. An example of such systems is U.S. Pat. No. 5,147,055 which discloses a diaper container that includes an activated charcoal filter to retain and absorb orders within the container.

Most waste receptacles are fitted with a lid designed to contain odors when the lid is closed. However, most lids are not designed to be perfectly air-tight in respect of their receptacles, or after repeated use become less-than air tight, permitting malodor to emanate from the receptacles even when they are closed. Even with the most air-tight containers, upon opening the container, the noxious odors escape into the area giving an extremely unpleasant sensation to the person attempting to add more trash to the receptacle. Location of the receptacles in a remote location is inconvenient and generally unsatisfactory.

Numerous receptacles have been proposed for temporarily holding diaper waste. These receptacles typically employ one of several approaches to reduce the emanation of malodor from the receptacle, which may be characterized as the use of making agents, odor sorbent material, inner lids or seals, air locks or sealed packaging.

Another problem with trash receptacles is that they tend to retain noxious odors even after the trash is ultimately removed. After a period of time a thorough and complete cleaning of such receptacles is necessary.

The scented diaper pail has been commercially available for many years. Scent is added to the diaper pail in the hope of hiding the smell of the malodor by producing a smell that masks the malodor to the olfactory senses. The problem with such pails is that the masking smell itself can often become irritating to the consumer, as well as the fact that most scented diaper pails loose their masking effect after a period of time.

A particularly difficult trash to retain for ultimate disposal is diapers. Diapers are typically stored and accumulated in a container. The cumulative odor of diapers being stored within the container frequently reaches such an offensive level that the diapers must be disposed of before the container is full. The latter leads to a large use of container liners such as bags, and excessive emptying operations. Excessive emptying operation can be of particular concern as one hesitates to leave the infant unattended or to carry the infant and the soiled diapers to a remote location. A further problem associated with such containers is that the containers themselves over time tend to retain the malodor even when no diapers are present in the containers. Therefore a thorough and complete cleaning of such containers is often necessary to reduce the lingering odor. Further, as many diaper disposal receptacles are not child-proof, toddlers playing around the container may inadvertently open the container to allow odors to escape or the child may reach in to touch solid diapers.

European patent application No. 0005660, the contents of which are incorporated by reference herein, describes a device for disposing kitchen refuse in packages enclosed by flexible tubing derived from a tubular pack of tubing surrounding a tubular guide. The device includes a tube sealing mechanism. The tubing passes from the pack over the top of and then down the guide to a position beneath the guide where it has been closed by fusion to provide a receptacle within the guide means. When this receptacle is full of refuse, a lever is manually operated to actuate an electro-mechanical apparatus including clamping and fusion devices that travel round closed tracks to perform the four-fold task of drawing the receptacle down below the tubular guide, fusing the tubing walls together to seal the top of the receptacle, sealing the tubing walls together to provide the closed base of the next receptacle and dividing the tubing by heat at a location between these two fusion locations to separate the filled package. There are a number of disadvantages with this device including the need for latches to prevent the wheels extending from the heating elements from inadvertently returning up the central track portions (as opposed to following the outer track portions as they should. A further disadvantage is that the heating element must be at least the width of the tube in order to seal the tube all the way across thereby preventing, for example, the escape of odors from the waste.

Another popular approach to disposing of such diapers has been with a device using a tube twisting mechanism to form a pouch about the diaper. As an example, see the disclosures of U.S. Pat. Nos. 4,869,049, 5,590,512, and 5,813,200, the contents of all of which are incorporated by reference herein.

The U.S. Pat. No. 5,813,200 to Jacoby, et al. discloses a device for disposing of soiled diapers in twisted packages. The device has a container body with a hinged base, a hinged lid, and an upward cylinder secured within the container body. A tubular core rests on a portion of the upward cylinder to allow rotation there between. A flexible tube or sleeve rests on a portion of the tubular core with the tubing being circumferentially pleated as stored. Springs are fixed to the container and project radially inward to engage a package formed from the tube. The springs are equally spaced around the interior of the container to hold the package during the forming of a twist in the tube.

The device disclosed in U.S. Pat. No. 5,813,200 is used to form a series of packages enclosing objects. The top of the flexible tubing is pulled upwards and tied into a knot. The closed end formed by the knot can then form the bottom of a package with the sidewalls formed by the tubing. The object is inserted and rests against the tubing near the knot. A rotatable interior lid is put into place and rotated such that the unused tubing and the tubular core rotate with respect to the package that is being formed. The package being formed does not rotate because it is held in place by friction between it and springs. Thus a package is formed between the knot and a first twist. Subsequently, objects are disposed and twisted in a like manner to form discrete packages with twists between them.

Devices such as that disclosed in U.S. Pat. No. 5,813,200 are a convenient way of disposing of soiled diapers. A disadvantage of the system is that the twists between packages may become unraveled, thereby allowing groups of diapers to collect within the tubing, which makes emptying the container more difficult. Further, the twists do not create a continuous, complete seal and, therefore, may allow odor to escape from a package. Increasing the twists between packages may eliminate the above disadvantages, however, this requires the use of additional tubing.

Another example of a device used to decrease odors that emanate from diaper waste is disclosed in U.S. Pat. Nos. 6,370,847 and 6,516,588, both issued to Jensen, et al. These related patents disclose a sealable diaper-disposal system that includes a container body, a tubular core on which flexible tubing is stored, and a tube-sealing mechanism having a pair of heating elements. The flexible tubing is pulled from the tubular core and passed between the pair of heating elements. The tube-sealing mechanism operates to move the pair of heating elements toward each other to fuse the width of the tubing, and away from each other to allow the tubing to be pushed into the lower portion of the container body.

The contents of all of the prior art references cited herein are incorporated by reference. From the above it can be understood by those having ordinary skill in the art that there are a number of disadvantages associated with prior art waste disposal devices using flexible tubing to form packets for disposal of waste materials. It is clear that a device is needed that will eliminate the disadvantages described above. Such a device should be relatively economical to purchase and operate, ensure that the seals between packets are complete and cannot come undone, and be easy to operate.

SUMMARY OF THE INVENTION

One aspect of the present invention is a waste container for sanitary disposal of waste including a container body defining a waste bin and an opening that provides access to the waste bin; a support mounted to the container body adjacent the opening, the support having a flange extending therefrom that is configured for mounting a tubing cassette above the waste bin, wherein the support encloses less than all of the opening to the waste compartment so that waste can be passed through the opening and into the waste chamber; a tubing cassette mounted to the flange of the support; and a tube twisting/sealing means for forming individual waste packets from tubing that is dispensed from the tubing cassette.

In another embodiment, the waste container comprises an automated turning or twisting mechanism, a rotatable tubing cassette which is structurally configured to be mounted to the flange of the support; and a retention means operationally configured to prevent rotation of a waste packet enclosed within the tubing when the cassette is rotated to allow twisting of the tubing to close the waste package. The flange may be configured to allow rotation of the tubing cassette. The cassette can be rotated by electrical power using a motorized rotating grip ring to create a closure by a twisting action of the flexible tubing when sequestering a waste packet. In one embodiment, the motorized apparatus for the sanitary disposal of waste comprises a plunging device with a suitable plate or disk for contacting the twisted closure of the waste package so that the plate or disk can downwardly push the enclosed package for a predetermined distance from the origin of tubing from the refill cassette's storage compartment, providing sufficient space for depositing a subsequent waste packet.

In another embodiment, the waste disposal device comprises an upper or head compartment located on top of the waste container, the upper or head compartment encompasses an apparatus comprising a drive plate mounted to the tubing cassette, a drive gear assembly engaged with the drive plate, and a motor mounted to the upper compartment apparatus and having an output shaft that rotates the drive gear when the motor is activated, the power from the motor being transmitted through the multiple gear assembly. A timing circuit may be employed for activating the motor to rotate the tubing cassette set at a predetermined amount of time or a predetermined number of times. A manually operated switch may be used for activating the motor.

In one aspect of the invention, the upper or head portion serves also as a lid over the lower receptacle compartment or waste bin of the waste container. The lid or upper compartment of the waste container of the invention can be hingedly attached to the container body for enclosing the opening to the waste bin. The lid or head portion of the container can be secured, for example, with a latch device. In addition, the hinge itself can include a latching mechanism or a biasing means to retain the lid in an open position. A foot pedal assembly can be attached to the lid as the mechanism for opening the lid. Such assemblies are well known to those of ordinary skill in the art.

In another aspect of the present invention, a waste container comprising a container body defining a waste bin and an opening that provides access to the waste bin is provided. The waste container further comprises a support mounted to the container body adjacent the opening, the support having a flange extending therefrom which is configured for mounting of a rotatable tubing cassette above the waste bin, wherein the support encloses less than all of the opening to the waste bin so that waste packs can be passed through the opening and into the waste bin.

In another aspect, the waste container is provided with a thrusting plate attached by a scissor slot assembly to a screw-type gear drive which is powered by an electrical motor through a gear transmission assembly; the activated thrust plate is extended downwardly to push a waste package into the bottom portion of the container after the package is sealed.

In one embodiment, the apparatus is further equipped with a plunging plate to effect a downward thrusting motion at the upper end sealed end of an enclosed waste package so that pulling of additional tubing from the refill cassette is effected so as to provide a pouch-like space below the cassette core opening in order to receive the next waste package, thereafter repeating the twist-tightening motion.

The invention also provides an automatically controlled apparatus for individually sequestering packs of odorous waste in a length of flexible tubing which is dispensed and depending from a core tube portion inside a tubular refill cassette. In one embodiment, the apparatus combines a lower compartment or bin for receiving and storing the tubing enclosed waste packs, and an upper compartment for accommodating and securing the electronically powered and controlled system for sequestering each pack of waste in the flexible tubing. In one embodiment, the sequestering or encapsulation of a waste package being initiated by an electrical actuator causing to start first, a rotational movement of the tubing refill cassette or dispenser so as to effect a twisting motion of the tubing in one direction while tightening of the flexible tubing which emanates from the cassette in a downward direction into the lower compartment or chamber of the waste receptacle. The waste packet sequestering part of the tubing is held by a retention or clamping device while the cassette is rotating. In a second step, the thrusting plate is activated to move downwardly in a thrusting motion to urge the sealed waste package into the waste receiving bin and simultaneously provide another length of flexible tubing for the next deposit of a waste packet. These and other aspects of the invention are disclosed in more detail herein below.

The waste disposal apparatus further provides a means for cutting the twisted sealed upper portion of the waste package and therefore the sealed flexible tubing. The cutting means are suitably located above the twisted portion of the tubing and below the refill cassette enabling removal of the sealed waste packages from the receptacle bins.

The sealing mechanism of the waste disposal apparatus can be further supplemented by an adhesive containing device or ribbon segmentally positioned on the inside surface of the tubing material, said adhesive being activated by the twisting of the flexible tubing. Alternatively, the flexible tubing material can comprise clinging properties for reinforced twist stabilization and sealing effect. The adhesive location can be placed on the inside of the flexible tubing at predetermined intervals or segments suitable for sequestering the waste packets.

A further aspect of the invention can be found in the film grip ring for gripping or holding the flexible tubing in place in order to prevent the inadvertent release of the stored refill tubing from the rotating cassette during the twisting operation. This advantageous aspect assists in creating a measurably effective tight twist lock of the sequestered waste packet in the tubing segment.

Another feature of the waste disposal apparatus comprises a trigger mechanism for actuating the thrust mechanism for determining the start of the downward motion of the thrusting plate at the end or completion of rotational motion the core tube effecting the twist closure of the flexible tubing above the sequestered waste packet. The trigger mechanism can be initiated by a timing device or optical counter which actuates the thrust mechanism after a preset interval. The optical counter can be aided by a laser-optical detection device.

In one embodiment, a receptacle is provided which comprises a container comprising a top portion, a bottom portion a side portion encompassing the void, a lid attached to the top portion of the container; a cassette comprising a rigid body formed by an internal core defining a first space, the core open at top and bottom, a surrounding casing wall positioned to provide a second space between the tubular core and the casing wall and a base wall joining a lower end of the surrounding casing wall to the lower end of the tubular core, a length of flexible tubing packed in the second space; one or more support member(s) projecting from the side portion of the container configured to retain the cassette between the top portion and the bottom portion of the container; and permitting communication of the flexible tubing from the cassette to the bottom portion of the container; a tube sealing mechanism operably configured to engage with the cassette to form and seal a packet of material in the flexible tubing by turning the cassette, and wherein the lid comprises an apparatus for actuating the tube sealing mechanism. In this embodiment of the invention, the receptacle can comprise, for example, a waste disposal container for disposing malodorous wastes including waste container for soiled diapers, nursing homes and hospitals wastes. The waste container comprises a support member, for example, a flange structurally configured to allow the cassette to be rotated thereon. In one embodiment, the cassette is mounted onto the flange and further comprises a drive plate, a drive gear structurally engaged with the drive plate, and a motor mounted on the container lid and having an output shaft that rotates the drive gear when the motor is activated. In another embodiment, the receptacle comprises a timing circuit activates the motor to rotate the cassette for a predetermined amount of time or a predetermined number of times. The receptacle may also comprise a manually operated switch for activating the motor. The receptacle comprises a lid which can be hingedly attached to the container, a plunging device which is movable downwardly into the bottom portion of the container for pushing a sealed waste package into the waste storage portion of the container. The receptacle may further comprise a first retention mechanism operably configured to prevent rotation of a packet when the cassette is rotated to create a seal in the flexible tubing; and a second retention mechanism operably configured to prevent release of the stored flexible tubing from the tubing cassette during rotation. In one embodiment, the receptacle may be further comprising a drive plate mounted on the cassette, a drive gear operably engaged with the drive plate, and a motor mounted to the container and having an output shaft that rotates the drive gear when the motor is activated. The receptacle may include a timing circuit activates the motor to rotate the cassette at a predetermined amount of time or a predetermined number of times.

In another embodiment, a receptacle is provided, comprising: a container comprising a top portion, a bottom portion, a side portion encompassing a void, a lid attached to the top portion of the container; a cassette comprising a rigid body formed by an internal core defining a first space, the core open at top and bottom, a surrounding casing wall positioned to provide a second space between the tubular core and the casing wall and a base wall joining a lower end of the surrounding casing wall to the lower end of the tubular core, a length of flexible tubing packed in the second space; one or more support member(s) projecting from the side portion of the container configured to retain the cassette between the top portion and the bottom portion of the container; and permitting communication of the flexible tubing from the cassette to the bottom portion of the container; a tube sealing mechanism operably configured to engage with the cassette to form and seal a packet of material in the flexible tubing by turning the cassette; a plunging mechanism operably configured to move a sealed waste packet downwardly while pulling a length of the flexible tubing from the cassette to create new space for enclosing a subsequent waste packet, and wherein the lid comprises an apparatus for actuating the tube sealing mechanism. In one embodiment, the receptacle may optionally further comprise a gripping mechanism for the flexible tubing to prevent release of the flexible tubing from the cassette during rotation of the cassette, or an apparatus operably configured to automatically package and seal waste material deposited within the flexible tubing into individual packets by means of motor-powered turning mechanism housed in the container, and wherein the flexible tubing is provided with an adhesive to reinforce the sealing mechanism.

In another embodiment, a method for disposing of waste material is provided, comprising: providing a length of flexible tubing having a first sealed portion of the tubing at a location along its length and an open end of the tubing; the tubing packed and stored within a disposable cassette and capable of retaining waste material therein; inserting the waste material through the open end of the flexible tubing until it contacts the first sealed portion of the tubing to form a waste package; retaining the waste package such that the waste package does not rotate in relation to the open end of the flexible tubing; rotating the open end of the flexible tubing to form a twist in the flexible tubing between the open end of the flexible tubing and the waste package; and optionally, sealing at least a portion of the flexible tubing to form a second sealed portion located above the waste packet enclosure. In one embodiment, the second sealed portion is accomplished by an electrothermal heating mechanism, or chemical adhesive application to at least a portion of the flexible tubing at the twist. In another embodiment, the retaining step of the method comprises retaining the waste package by gripping the waste package to prevent movement of the waste package during rotation of the cassette.

In yet another embodiment, a container for automated waste disposal, comprising: a container bin compartment structurally configured to received packaged waste material; a container top compartment enclosing an apparatus for automated packaging the waste material in the container bin compartment; a combination of an automatically controlled motor-driven cassette turning mechanism which packages the waste material into individual packets in a flexible tubing inside the container bin compartment; and an automatically controlled motor-driven plunging device operably configured to move a sealed packaged waste material and downwardly pushes the packaged waste material, thereby pulling a predetermined length of the flexible tubing to provide space for packaging of subsequent waste material.

The invention also provides a cassette for use with the receptacles of the invention. The cassette comprises an outer wall having a top surface, a bottom surface, and two side surfaces; an inner wall having a top surface, a bottom surface, and two side surfaces; flexible tubing positioned between the outer wall and the inner wall; a rim having a top surface and a bottom surface and two side surfaces positioned between the outer wall and the inner wall, the rim emanating from the top surface of either of the outer wall or inner wall and extending partially towards the other wall, the bottom surface of the rim facing the flexible tubing; wherein the rim comprises a plurality of protrusions or projections on the top surface of the rim. In one embodiments, the protrusions or projections are operably configured to engage with a rotation mechanism of a waste disposal device. In one embodiment, the cassette further comprises top and bottom surfaces which may optionally comprise protrusions, projections or a geared rim for engaging with a turning mechanism in making a sealed waste package.

BRIEF DESCRIPTION OF THE FIGURES

A more complete appreciation of the invention and the advantages thereof will be more readily apparent by reference to the detailed description of the preferred embodiments when considered in connection with the accompanying figures, wherein.

It is notable that like items depicted in different figures may be referred to by the same reference numbers.

DETAILED DESCRIPTION OF THE PREFERRED EMBODIMENTS

Figure 1:
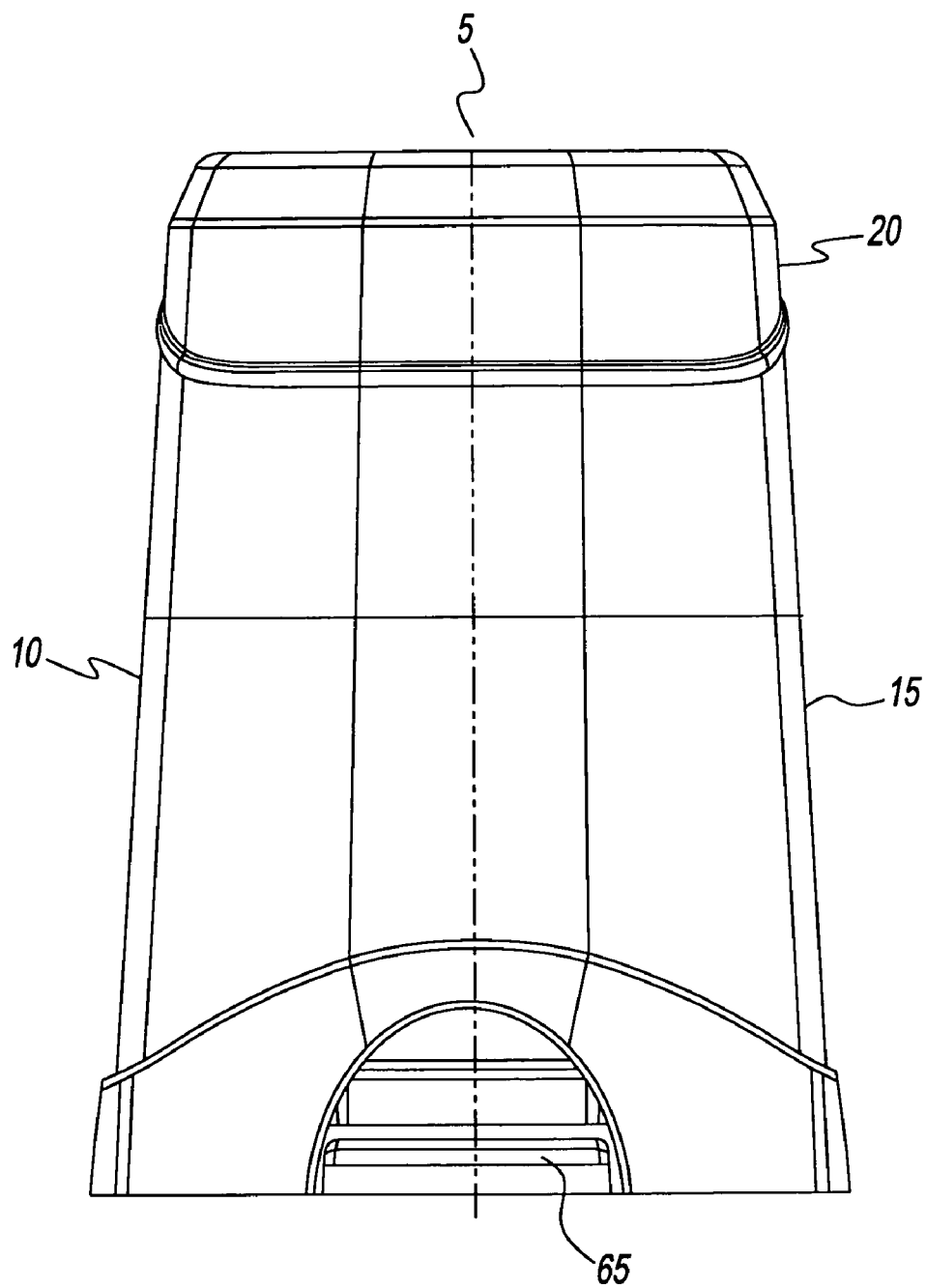
FIG. 1 is an elevational side view of an embodiment of the present invention.

The present invention provides an automatic device for the convenient and hygienic sequestering of waste packets. Waste packets are understood to comprise diapers or similar malodorous waste contents.

For the purpose of this invention, any device that closes off tubing at a point along the length of the tubing is considered a "tube-sealing means." Therefore, for example, fusion devices, which close off tubing with heating elements, and twisting devices, which close off tubing by inducing a twist, are considered "tube-sealing means." Several tube-sealing means are disclosed herein above in the background of the invention. Other tube-sealing means are disclosed in U.S. Pat. Nos. 6,128,890 and 6,065,272, and U.S. Publication No. US 2002/0162304, the contents of all of which are incorporated by reference herein. In this description and the accompanying figures of the automated sequestering and waste disposal apparatus, reference is only made to a flexible tubing-twisting or twist-locking mechanism for closing off the flexible tubing to sequester the individual waste packets within the tubing as well as the associated downward placing of the sequestered waste packets by a plunger device.

The present invention as described in this embodiment is an improvement over other waste disposal devices or systems in that it comprises an automatically controlled mechanism for sequestering the waste packets individually inside a flexible tubing bay of some length dispensed from a refillable cassette. The hands-off embodiment features a motor-driven rotation of the refillable cassette comprising an inner core of dispensable tubing. When the waste device is actuated, the rotational movement of the cassette effects the twisting of the tubing so as to form a sealed waste packet while the packet is held in place by spring-aided holder/brackets. One embodiment comprises a driveshaft connected to the motor through a gear assembly or transmission. The driveshaft is activated when rotational movement of the cassette is completed and the waste packet is closed off or sequestered in the tubing material. In this embodiment, the driveshaft, for example, is connected by a pinion through the connecting scissor slots to the thrust plate of the plunger. The rotation of the driveshaft, i.e., a rod with a screw-type outer ridge, winds through the nut-like center hole of the pinion, which is thereby slideably moved along holding or locating means or rod causing the scissor connectors to extend and vertically move the thrust plate to plunge or press downwardly on the sealed waste packet, which is consequently placed in the receptacle portion of the waste container.

The motorized two-step mechanism of the apparatus controlling the twisting and plunging of the automated waste sequestering operation can be manually turned on by pushing a button, for example, on the top portion of the container, lid or head portion of the container. Alternatively, the mechanism may be controlled by a foot operated switch or lever. The motorized system is activated by pressing the button, and the button makes electrical contact with the actuator of the motor in the apparatus causing an initial twisting rotation of the cassette core tube. The rotational movement of the cassette by the motor driveshaft being transmitted through a set of gears to the rotational ring that engages the cassette rim through the small ridges projecting therefrom on top of the cassette when the attached upper head or lid compartment of the waste receptacle is closed.

The second step of the automated control of the waste sequestering mechanism causes a plunging device to downwardly thrust and extend so that the sealed waste package is pushed into the receptacle space of the bottom portion of the container. Thus, the flexible tubing is pulled from the storage compartment of the cassette through a gap between the inner core tube and the rim atop the refill cassette to form a new space for depositing new waste.

Alternatively, the lid can be operationally configured to be opened by foot. In this embodiment, the waste disposal device is provided with a pedal-like structure which is operably configured and attached to the lid so that the motorized mechanism can be operated or activate by the closing of the lid. A waste load is deposited into the open center of the cassette. Upon release of foot-operated mechanism, the lid closes and the motorized actuator mechanism is activated, for example, using a cog gearing system which causes rotation of the cassette holding a tubing bag receptacle. The rotation accomplishes two activities for sequestering a diaper or similar waste load and dropping or moving the same downwardly into the tubing bag and into the container bin.

In the closed lid position, the actuator initiates the rotational force on the tubing cassette by the refill twister exerting pressure on the beveled ring surface of the cassette. The rotational movement is measured to continue until sufficiently tight twisting has been effected on the tubing containing the waste so as to seal the top opening and thereby retain the waste load. At the moment when the twisting or tightening by cassette rotation is complete for sufficient closure of the tubing tubular bag, a vertically dispensed gearing mechanism is turned on and causes a downward movement of the cassette holder and cassette with attached waste loaded tubular receptacle portion. This downward thrust is mediated through a scissor link assembly which stretches out to extend along the axis of the cassette opening, moving the sequestered waste load downward.

Simultaneous to the motorized rotational force input on the cassette rim, a film grip ring is activated to contact and clamp down on to the flexible tubing emanating and hanging over the top edge of the inner core tube of the tubing cassette. This contact prevents release of tubing from the storage compartment of the cassette during the rotational twisting operation.

Throughout this specification, the word "comprise" or variations such as "comprises" or "comprising" will be understood to imply the inclusion of a stated integer or group of integers but not the exclusion of any other integer or group of integers. The general embodiment of the present invention is best understood by reference to FIGS. 1-7 of the drawings.

Referring to FIG. 1, a waste container 10 is shown comprising a lower or waste storing bin compartment 15 and an upper lid or head compartment 20 with an optional activation start button 5.

The automated twist waste disposal apparatus useful for sequestering waste packets such as diapers in twist-sealable flexible tubing as illustrated in one embodiment of the invention by taking reference to FIGS. 1, 2, 3, and 4.

The disposal device 10 comprises top or lid portion 20 which comprises hingedly attached and latch-secured pivoting lid or cover configuration and a bottom or bin portion 15, comprising an approximately cylindrical or cone-like shape.

Figure 2:
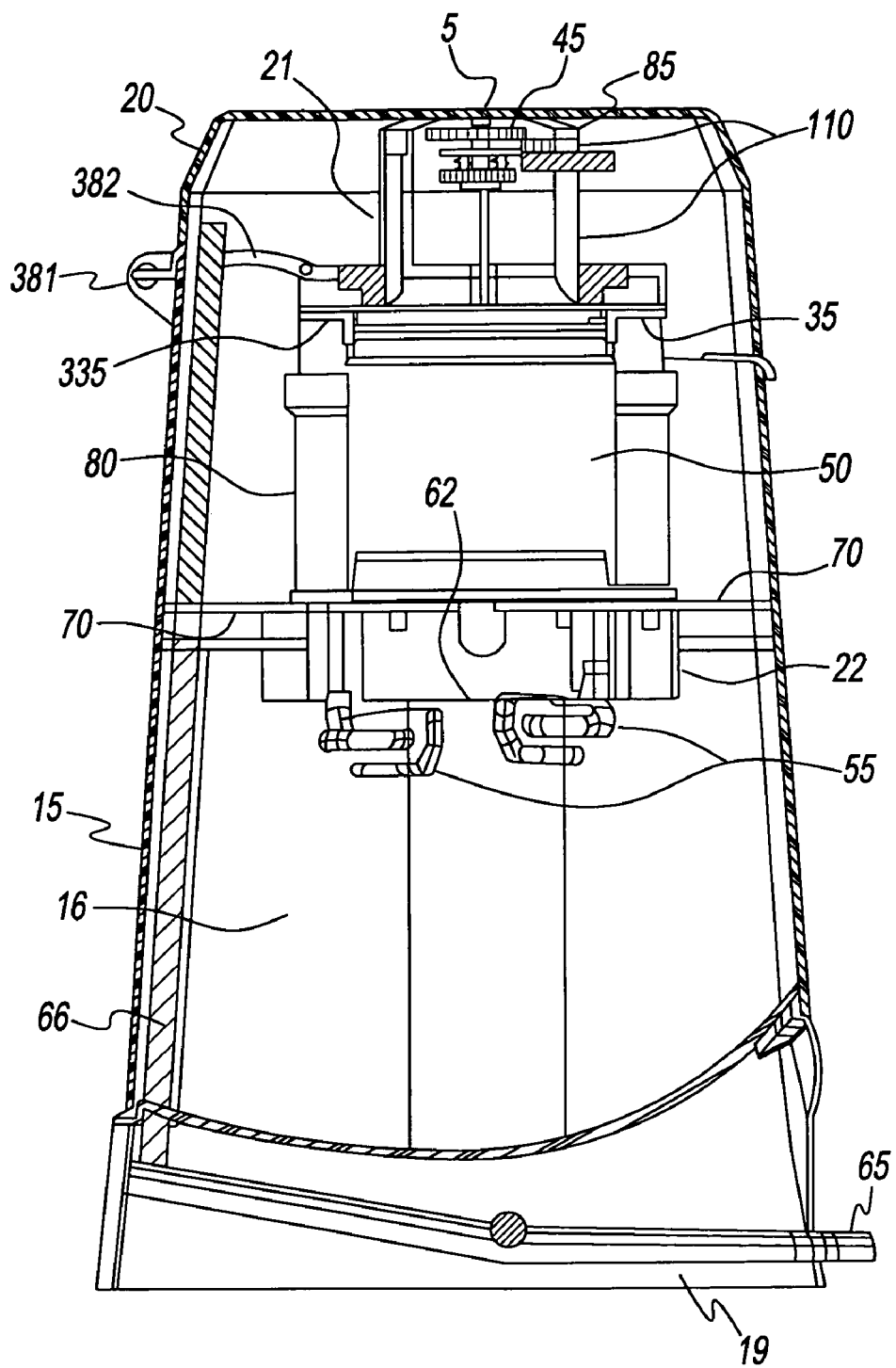
FIG. 2 is a sectional side view thereof.

In FIG. 2, the lid portion 20 is shown to contain an apparatus for automatic control of twisting and lowering of tubing below the refill cassette, the apparatus comprising an upper body portion 21 and a lower body portion 22. More specifically, the lid 20 houses or contains the apparatus upper body 21, comprising an electronic motor-driven control gear assembly 110, an actuator 45, a rotatory grip ring or refill twister 35 for contacting and rotating the tubing refill cassette body 50 effectively twisting the flexible tubing 52 which emanates through a gap 54 between the rim 57 of the cassette 50 and the core tube 61, and is folded down through the open cassette tube core area 51 into the interior bin space 16 as partially shown in FIGS. 3 and 4.

The lower body of apparatus 22 encompasses the removable refill cassette 50 as well as a retaining means or spring assembly 55 positioned to hold the flexible tubing 52 which encloses a waste pack (not shown) in the bin space 16 during the twist-closure operation. The tubing cassette 50 houses a length of tubing material 52 for sequestering the waste packets sequentially in the waste bin space 16.

A lid 20 secured by a hinge 81 to the waste bin 15 includes a latch 82. The waste bin 16 also includes a hinged base 19 for providing access to the lower interior of the second waste bin 16. The hinged base 19 includes a latch (not shown) for securing the hinged base 19 in a closed position.

The bottom rim 58 of the tubing refill cassette body 50 rests on a flange support or holding ring 70 which is affixed to the internal wall side of the bin 15 of the device 10. The flexible tubing material 52 is stored in a continuously folded manner in the tubing storage compartment 59 of the cassette 50.

Figure 5:
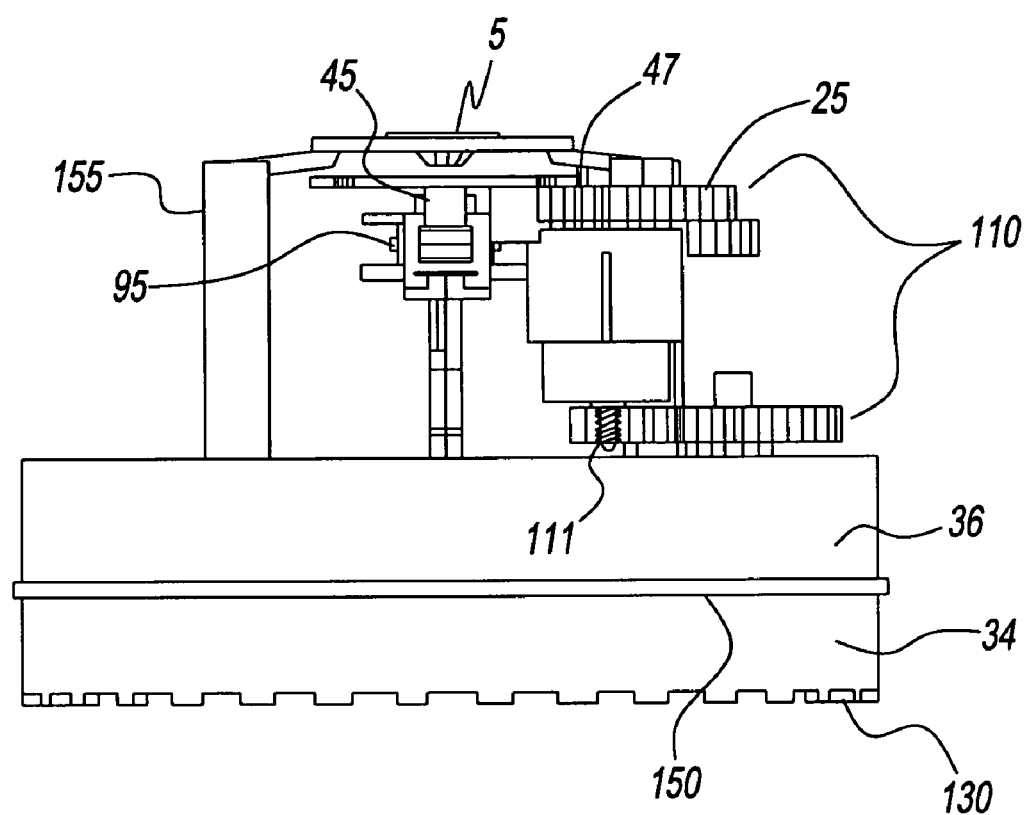
FIG. 5 is an elevational view of an embodiment of the refill twister apparatus.

Referring to FIG. 5, the apparatus embodiment of the gear assembly 110 in a housing or cap structure 155 of the upper body portion 21 of the electronic motor-driving apparatus 30 has a motor 47 located near the gear idler 25, which motor 47 is started when the manually depressed button 5 on the lid 15 makes contact with the switch 95. The first action of the motor-driven gear assembly causes rotation of the refill twister 34 comprising a tubular ring structure 36 which exhibits a notched bottom surface 130 that is situated to make contact with the top ring or collar of the refill cassette 50 so as to propel the cassette into rotational motion. The tubular refill twisting device 36 is provided with a ridge 150.

Figure 6:
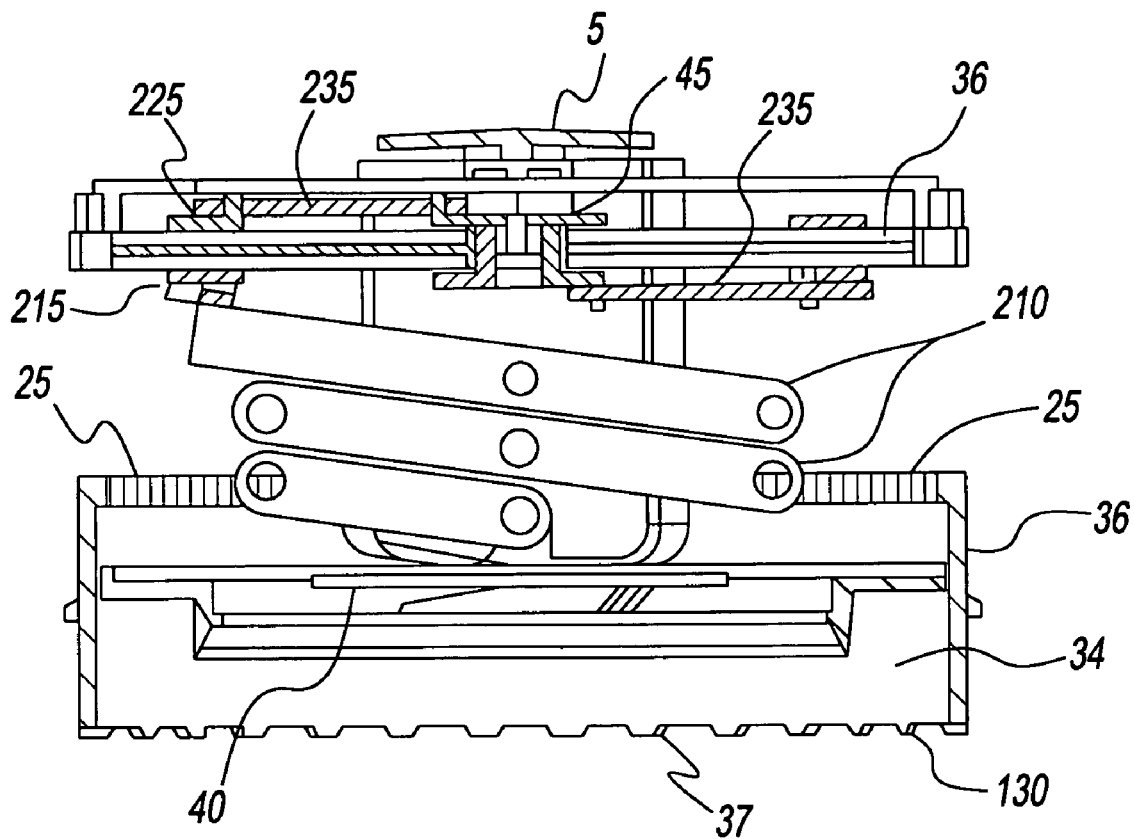
FIG. 6 is a sectional view thereof.
Figure 7:
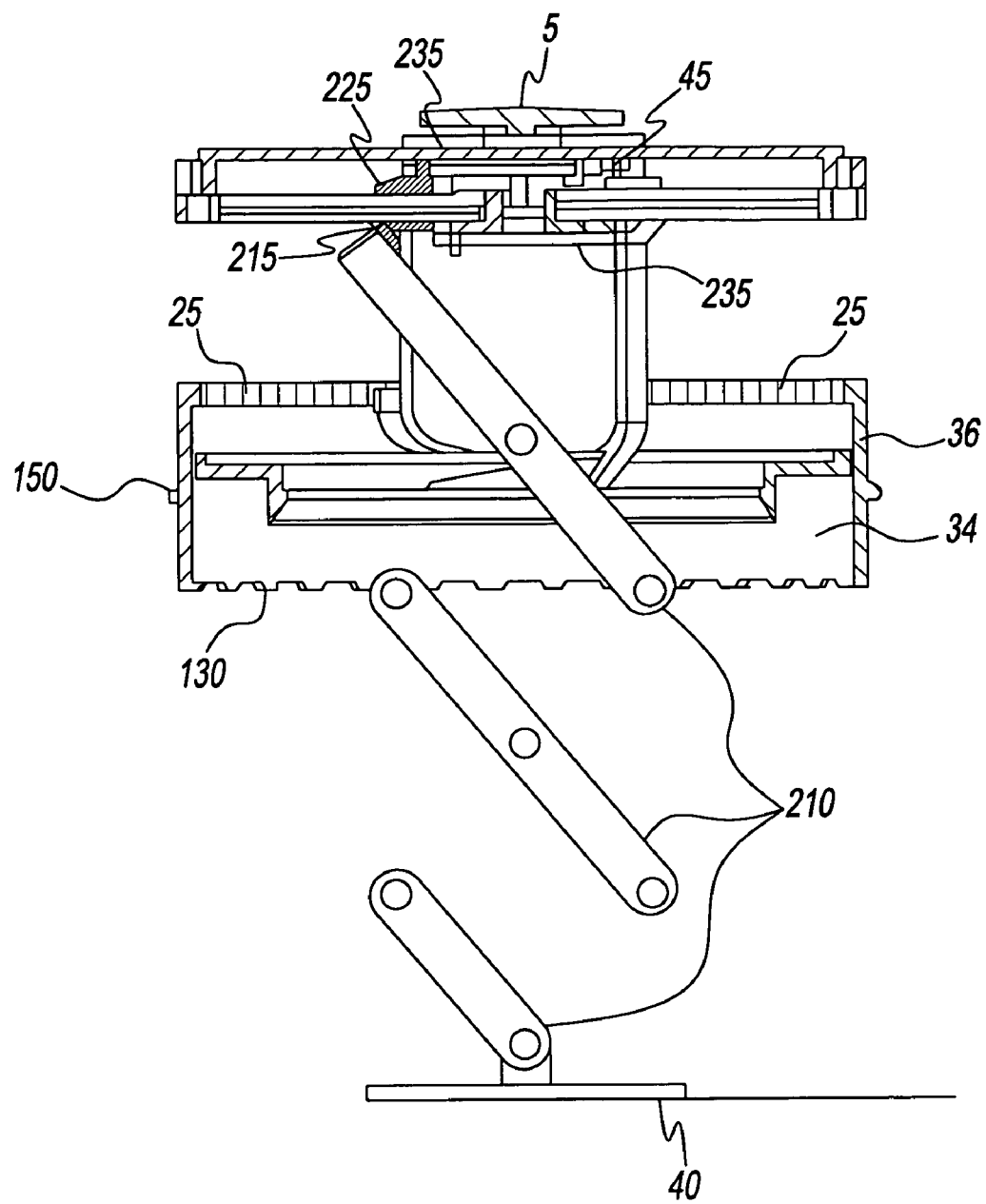
FIG. 7 is a sectional view of the extended plunger mechanism embodiment.

Referring to FIGS. 6 and 7, an embodiment of the invention is represented showing the scissor link assembly 210 linked a slideable U-joint type linkage 215. The pinion is saddled on a radially positioned carrier device 36 with a bracket 225 while at one point attached to a linkage 210 connecting assembly holder 215, and at another point attached to a drive rod 235. The drive rod 235 comprising a screw-like wound surface is inserted into the nut-type center of the which can be centrally moved along the carrying means or rod 36 by the revolutions of the screw-type positioning rod so that the drive rod 235 rotations cause the scissor link connecting linkage 215 to move towards the center so as to move the plunger plate 40 vertically downward through open central portion 37 of the upper apparatus configuration 21 and the cassette core opening 62.

The twisting operation is further facilitated by the film grip ring 35 which, during the twisting operation, acts as a brake pressing onto the flexible tubing 52 atop the cassette core tube 61, and prevents the tubing 52 from being pulled out of the refill cassette 50 storage compartment 60 during the cassette rotation.

A revolution counting mechanism is included in the upper portion of the apparatus 21 controlling the twisting operation as well as the downward motion of the plunger 40.

Figure 3:
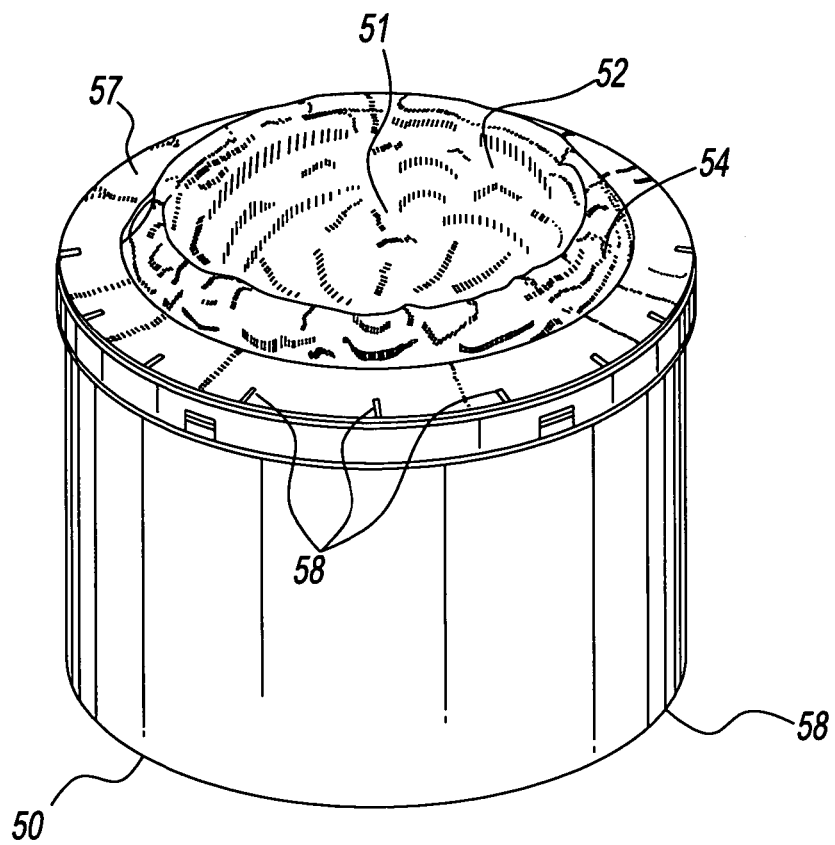
FIG. 3 is an elevational view of a refill cassette embodiment of the invention.
Figure 4:
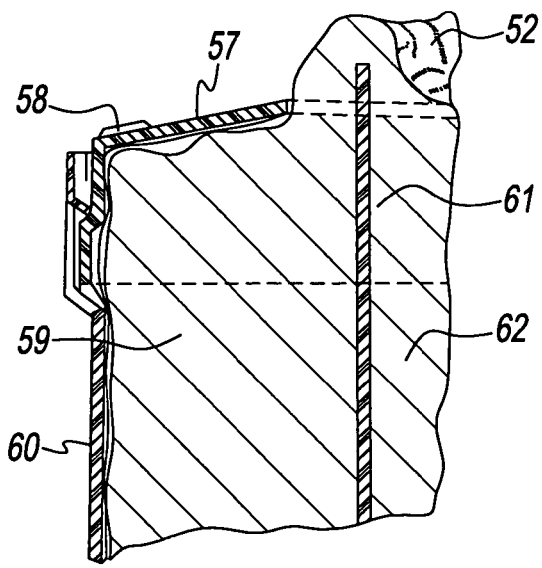
FIG. 4 is a sectional side view thereof.

Referring again to the illustrations of FIGS. 3 and 4, the refill cassette 50 stores the flexible tubing 52 which emanates from the storage compartment 59 through the gap 54 between the rim 57 and the cassette's core tube wall 61 and then fords into the inner core area 62, hanging into the bin space 16 below. The rim 57 is provided with small ridges for effectively engaging the refill twister 34, in particular, the gear surface the refill twister 130 when rotating the cassette 50 and the top portion of the flexible tubing enclosing the diaper deposit (not shown). An exemplary tubing cassette is disclosed in U.S. Pat. No. 4,934,529, the contents of which are incorporated by reference herein.

Taking reference again to FIG. 2, the lid portion 20 of this embodiment 10 can be opened by depressing a foot pedal arrangement 65 which acts through a push rod 66 on the hinge assembly 81 of the lid 20, exposing the open core area 62 of the refill cassette 50 for depositing a waste packet.

As further illustrated in FIG. 2, the retention springs 55 are attached to the flange 70 and retain or hold a waste package (not shown) stationary while the rotating refill twister 34 causes the cassette collar or rim 57 to rotate the tubing cassette 50 inducing a twisting motion in the flexible tubing 52. As used herein, the term "retention means" shall include any retention device for retaining or restraining a waste package (not shown) in a stationary position while the cassette 50 and the flexible tubing 56 dependent through the cassette core tube area 62 is rotated. The term shall include, for example, retention devices as disclosed in U.S. Pat. Nos. 4,869,049, 5,590,512, 6,170,240, 6,128,890, 6,370,847, JP 592039015 (P2000-247401 A), and U.S. patent Publication No. US 2002/0162304, the contents of all of which are incorporated by reference herein. Other means for rotating the tubing cassette 50 may be employed.

As used herein, the term "retention means" shall include any retention device for retaining a tubing enclosed waste package stationary while the flexible tubing 52 is rotated. The term shall include, for example, retention devices as disclosed in U.S. Pat. Nos. 4,869,049, 5,590,512, 6,170,240, 6,128,890, 6,370,847, JP 592039015 (P2000-247401 A), and U.S. patent Publication No. US 2002/0162304, the contents of all of which are incorporated by reference herein.

Although the present invention and its advantages have been described in detail, it should be understood that various changes, substitutions and alterations can be made therein without departing from the spirit and scope of the invention as defined by the appended claims. For example, components in one figure can be combined with components shown in another figure.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

What is claimed is:

1. A receptacle, comprising:
a container comprising a top portion, a bottom portion, a side portion encompassing a void, a lid attached to said top portion of the container;
a cassette comprising a rigid body formed by a tubular core defining a first space, said tubular core open at top and bottom, a surrounding casing wall positioned to provide a second space between said tubular core and said casing wall and a base wall joining a lower end of said surrounding casing wall to a lower end of said tubular core, a length of flexible tubing packed in said second space;
one or more support member(s) projecting from said side portion of said container configured to retain said cassette between said top portion and said bottom portion of said container and permitting communication of said flexible tubing from said cassette to said bottom portion of said container, said cassette being rotatable, said support member comprising a flange structurally configured to allow said cassette to be rotated;
a tube sealing mechanism operably configured to engage with said cassette to form and seal a packet of material in said flexible tubing by rotating said cassette;
a drive plate mounted on said cassette;
a drive gear operably engaged with said drive plate;
a motor mounted to said container and having an output shaft that rotates said drive gear when said motor is activated; and
a timing circuit activating said motor to rotate said cassette at a predetermined amount of time or a predetermined number of times,
wherein said lid comprises an apparatus for actuating said tube sealing mechanism.

2. The receptacle of claim 1, wherein said receptacle comprises a waste disposal container.

3. The receptacle of claim 1, wherein said lid is hingedly attached to said container.

4. The receptacle of claim 1, further comprising a plunging device which is movable downwardly into said bottom portion of said container.

5. The receptacle of claim 1, further comprising: a first retention mechanism operably configured to prevent rotation of a packet when said cassette is rotated to create a seal in said flexible tubing; and a second retention mechanism operably configured to prevent release of said stored flexible tubing from said tubing cassette during rotation.

6. The receptacle of claim 1, wherein said flexible tubing is provided with an adhesive.

7. The receptacle of claim 1, wherein said waste material is a soiled diaper.

8. A receptacle, comprising:
a container comprising a top portion, a bottom portion, a side portion encompassing a void, a lid attached to said top portion of the container;
a cassette comprising a rigid body formed by a tubular core defining a first space, said tubular core open at top and bottom, a surrounding casing wall positioned to provide a second space between said tubular core and said casing wall and a base wall joining a lower end of said surrounding casing wall to a lower end of said tubular core, a length of flexible tubing packed in said second space;
one or more support member(s) projecting from said side portion of said container configured to retain said cassette between said top portion and said bottom portion of said container and permitting communication of said flexible tubing from said cassette to said bottom portion of said container, said support member comprising a flange structurally configured to allow said cassette to be rotated, said cassette being mounted onto said flange;
a tube sealing mechanism operably configured to engage with said cassette to form and seal a packet of material in said flexible tubing by rotating said cassette;
a drive plate mounted on said cassette;
a drive gear structurally engaged with said drive plate;
a motor mounted on said container lid and having an output shaft that rotates said drive gear when said motor is activated; and
a manually operated switch for activating said motor,
wherein said lid comprises an apparatus for actuating said tube sealing mechanism.

9. A receptacle, comprising:
a container comprising a top portion, a bottom portion, a side portion encompassing a void, a lid attached to said top portion of said container;
a cassette comprising a rigid body formed by a tubular core defining a first space, said core open at top and bottom, a surrounding casing wall positioned to provide a second space between said tubular core and said casing wall and a base wall joining a lower end of said surrounding casing wall to a lower end of said tubular core, a length of flexible tubing packed in said second space, said cassette being rotatable;
one or more support member(s) projecting from said side portion of said container configured to retain said cassette between said top portion and said bottom portion of said container and permitting communication of said flexible tubing from said cassette to said bottom portion of said container, said support member comprising a flange structurally configured to allow said cassette to be rotated;

a tube sealing mechanism operably configured to engage with said cassette to form and seal a packet of material in said flexible tubing by rotating said cassette;

a plunging mechanism operably configured to move a sealed waste packet downwardly while pulling a length of said flexible tubing from said cassette to create new space for enclosing a subsequent waste packet, a drive plate mounted on said cassette;

a drive gear operably engaged with said drive plate;

a motor mounted to said container and having an output shaft that rotates said drive gear when said motor is activated; and a timing circuit activates said motor to rotate said cassette at a predetermined amount of time or a predetermined number of times, wherein said lid comprises an apparatus for actuating said tube sealing mechanism.

10. The receptacle of claim 9, further comprising a gripping mechanism for said flexible tubing to prevent release of said flexible tubing from said cassette during rotation of said cassette.

11. The receptacle of claim 9, wherein said flexible tubing is provided with an adhesive.

12. The receptacle of claim 9, wherein said waste material is a soiled diaper.

13. A container for automated waste disposal, comprising:

a container bin compartment structurally configured to receive packaged waste material;

a container top compartment enclosing an apparatus for automated packaging said waste material in said container bin compartment;

a cassette comprising a rigid body formed by a tubular core defining a first space, said core open at top and bottom, a surrounding casing wall positioned to provide a second space between said tubular core and said casing wall and a base wall joining a lower end of said surrounding casing wall to a lower end of said tubular core, a length of flexible tubing packed in said second space;

one or more support member(s) projecting from a side portion of said container top configured to retain said cassette permitting communication of said flexible tubing from said cassette to said container bin compartment, said support member comprising a flange structurally configured to allow said cassette to be rotated;

a combination of an automatically controlled motor-driven cassette turning mechanism which packages said waste material into individual packets in a flexible tubing inside said container bin compartment and an automatically controlled motor-driven plunging device operably configured to move a sealed packaged waste material and downwardly push said packaged waste material, thereby pulling a predetermined length of said flexible tubing to provide space for packaging of subsequent waste material;

a drive plate mounted on said cassette;

a drive gear operably engaged with said drive plate;

a motor mounted to said container top compartment and having an output shaft that rotates said drive gear when said motor is activated; and a timing circuit activates said motor to rotate said cassette at a predetermined amount of time or a predetermined number of times.

14. A waste disposal apparatus comprising:

a container having a lid, said lid being movable between a closed position covering an opening into said container and an open position providing access into said opening;

a cassette comprising a rigid body formed by a tubular core defining a first space, said tubular core open at top and bottom, a surrounding casing wall positioned to provide a second space between said tubular core and said casing wall, and a base wall joining a lower end of said surrounding casing wall to a lower end of said tubular core, a length of flexible tubing packed in said second space;

a support member projecting from said side portion of said container to support said cassette in said container, said flexible tubing being dispensable from said cassette into a bottom portion of said container;

a tube sealing mechanism having a motor mounted to said lid, said tube sealing mechanism for engaging with said cassette to form and seal a packet of material in said flexible tubing by turning said cassette;

a plunging mechanism for pushing a sealed waste packet downwardly while pulling a length of said flexible tubing from said cassette, said plunging mechanism having a scissor link assembly to move a plunger plate through said first space.

15. The waste disposal device of claim 14, wherein said scissor link assembly has a drive rod comprising a screw-like wound surface that is inserted into a nut-type center of a scissor link connecting linkage, and wherein said scissor link connecting linkage is moved along said drive rod by rotating said drive rod to move said plunger.

* * * * *